UNITED STATES PATENT OFFICE.

ANDREW J. RUSSELL, OF NEW YORK, N. Y.

IMPROVED ADHESIVE MATERIAL.

Specification forming part of Letters Patent No. 31,909, dated April 2, 1861.

*To all whom it may concern:*

Be it known that I, ANDREW J. RUSSELL, of the city, county, and State of New York, have invented a new and useful Dry Sealing Material for Letters, Papers, Packages, and such Articles; and I do hereby declare that the following is a full, clear, and exact description of the same.

To enable others skilled in the art to make and use my invention, I will proceed to describe it.

I first make up an adhesive composition as follows: In one pint (1 pt.) of water I dissolve four ounces (4 oz.) of gum-arabic, and one ounce (1 oz.) of good white glue, and about one-tenth of an ounce ($\frac{1}{10}$ oz.) of common alum. I now take some fine tissue or other paper, in sheets, and dip it into this adhesive solution, so as to saturate it perfectly. I then hang this saturated paper up on fine cords in a warm apartment until it is perfectly dry, when it forms my dry adhesive sealing material. It is now cut up into narrow strips resembling thin ribbons of parchment, a thousand of which may be carried in a common letter-envelope placed in a gentleman's vest-pocket.

My dry adhesive sealing material may also be made by incorporating the adhesive substance with the pulp of paper during the manufacture of the latter. It may also be made by applying the adhesive composition to the entire surface of porous paper with a sponge.

Any suitable gum may be employed as a substitute for gum-arabic or for glue in the foregoing-described adhesive compound; but the composition described answers admirably and is very easily made. The use of the alum in the compound is to prevent the material from becoming moldy and from decomposition, as it is a good antiseptic agent. It also tends to harden the material in a slight degree and obviate the absorption of moisture, thus preventing the material from becoming sticky in warm weather.

In using my dry adhesive sealing material—such as for sealing a letter or the wrapper of a newspaper—I take a strip of it in my hand, slightly moisten the end, or as much as I wish to use, with saliva, then introduce it between the surfaces of the paper to be joined together, and press these surfaces together and tear off that part of the dry strip of sealing material which had not been inclosed, and the letter will be sealed. All this can be done with great rapidity and a very small portion of the sealing material is sufficient for sealing a letter or the wrapper of a package.

Liquid gum, called "mucilage," is very generally employed at present by those engaged in literary pursuits for pasting and joining together papers. This is liable to be spilled upon valuable documents, and thus injure them. My sealing material, while it is equally as efficient, is far more cleanly and convenient for joining together papers and wrappers, as it can be laid down among the most important papers without injuring them in the least. As a substitute for liquid paste, wafers, stick-lac, and the like, it is a very useful, convenient, portable, adhesive material.

Having thus described my invention, I claim and desire to secure by Letters Patent—

As an improved article of manufacture, the dry adhesive sealing material, made as herein shown and described.

A. J. RUSSELL.

Witnesses:
M. M. LIVINGSTON,
C. W. COWTAN.